US012570554B2

(12) United States Patent (10) Patent No.: US 12,570,554 B2
Muck (45) Date of Patent: Mar. 10, 2026

(54) METHOD OF REMOVING A URANIUM SOURCE FROM A WATER

(71) Applicant: OASE GMBH, Hoerstel (DE)

(72) Inventor: Thorsten Muck, Ibbenbueren (DE)

(73) Assignee: OASE GMBH, Hoerstel (DE)

( * ) Notice: Subject to any disclaimer, the term of this patent is extended or adjusted under 35 U.S.C. 154(b) by 322 days.

(21) Appl. No.: 18/280,819

(22) PCT Filed: Mar. 8, 2022

(86) PCT No.: PCT/EP2022/055841
§ 371 (c)(1),
(2) Date: Sep. 7, 2023

(87) PCT Pub. No.: WO2022/189407
PCT Pub. Date: Sep. 15, 2022

(65) Prior Publication Data
US 2024/0140838 A1 May 2, 2024

(30) Foreign Application Priority Data

Mar. 8, 2021 (DE) ..................... 10 2021 202 208.1

(51) Int. Cl.
*C02F 1/42* (2023.01)
*C01G 49/10* (2006.01)
(Continued)

(52) U.S. Cl.
CPC ............ *C02F 1/5236* (2013.01); *C01G 49/10* (2013.01); *C01G 49/14* (2013.01); *C02F 1/28* (2013.01); *C02F 1/44* (2013.01); *C02F 1/66* (2013.01); *C01D 7/00* (2013.01); *C01F 5/24*
(2013.01); *C01F 11/18* (2013.01); *C02F 2101/006* (2013.01); *C02F 2209/06* (2013.01); *C02F 2209/44* (2013.01)

(58) Field of Classification Search
CPC ....... C01G 49/08–10; C01F 11/18–188; C01F 5/24
See application file for complete search history.

(56) References Cited

U.S. PATENT DOCUMENTS 4,402,918 A 9/1983 Elliott
4,485,075 A 11/1984 Maurel

FOREIGN PATENT DOCUMENTS

CN 101429860 A 5/2009
CN 111547877 A * 8/2020 ................ C02F 9/00
(Continued)

OTHER PUBLICATIONS

Machine translation of CN-111547877-A, pp. 1-7. (Year: 2020).*
(Continued)

*Primary Examiner* — Clare M Perrin
(74) *Attorney, Agent, or Firm* — Csaba Henter; MILLEN, WHITE, ZELANO & BRANIGAN

(57) ABSTRACT

The present invention relates to a method of removing a uranium source from a water, a kit for removing a uranium source from a water, and a use of a powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate in a method of removing a uranium source from a water.

20 Claims, 1 Drawing Sheet

(51) Int. Cl.

| | |
|---|---|
| *C01G 49/14* | (2006.01) |
| *C02F 1/28* | (2023.01) |
| *C02F 1/44* | (2023.01) |
| *C02F 1/52* | (2023.01) |
| *C02F 1/66* | (2023.01) |
| *C01D 7/00* | (2006.01) |
| *C01F 5/24* | (2006.01) |
| *C01F 11/18* | (2006.01) |
| *C02F 101/00* | (2006.01) |

(56) References Cited

FOREIGN PATENT DOCUMENTS

| | | | | | |
|---|---|---|---|---|---|
| CN | 115849492 | A | * | 3/2023 | |
| DE | 4313127 | A1 | | 10/1994 | |
| FR | 2433480 | A2 | | 3/1980 | |
| GB | 730230 | A | | 5/1955 | |
| WO | WO-2016077974 | A1 | * | 5/2016 | ............... G21F 9/12 |

OTHER PUBLICATIONS

Machine translation of CN-115849492-A, pp. 1-8. (Year: 2023).*
Machine translation of WO 2016077974 A1, pp. 1-6. (Year: 2016).*
China National Intellectual Property Office Search Report dated Jul. 8, 2025 issued in corresponding application 2022800202063.
International Search report PCT/EP2022/055841 dated Jun. 28, 2022 (pp. 1-4) and Written Opinion of ISA (pp. 1-3).

* cited by examiner

METHOD OF REMOVING A URANIUM SOURCE FROM A WATER

The present invention relates to a method of removing a uranium source from a water, a kit for removing a uranium source from a water, and a use of a powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate in a method of removing a uranium source from a water.

BACKGROUND ART

Uranium is a heavy metal that—though rare—can be found in natural environments and has also been spread due to nuclear testing as well as industrial use. Furthermore, uranium may also be present in fertilizers, e.g. phosphorous containing fertilizers, e.g. phosphate fertilizers, and may be particularly problematic due to uranium release into the ground water. While its use for generating electricity is still very much needed, uranium and its ions, particularly cations like the uranyl cation, are also poisonous and carcinogenic. Although uranium is only present in the earth crust at low levels, still a significant amount of uranium can be found in water sources, particularly also potable water and drinking water.

Due to its above negative impact on health, water works are striving for lowering the levels of uranium particularly in drinking water. While several solutions have been developed over the years, particularly the solubility of the uranyl cation in water still renders the removal of uranium sources in water a difficult task.

Several ideas for lowering the level of uranium in water have been considered and tested in the PhD-thesis "Entfernung von Uran aus Trinkwasser durch Adsorption an Granuliertem Eisenhydroxid (GEH)" of Dipl.-Ing. Carsten Bahr, Faculty III of the Technical University Berlin, 2012. In this regard it is noted that—e.g. depending on pH—the chemistry of uranium inside water is very complex, as a manifold of different phases exist, partly even in parallel, e.g. different hydroxo and carbonate complexes at a pH between 4 and 8. Another method of removing uranium is disclosed in DE 43 13 127 A1. From a themodynamics point of view, the active phase during e.g. a precipitation of uranyl ions in an aqueous environment is still not known. Further, also the influence of other parameters like total inorganic carbon (TIC), water hardness, e.g. influenced by $Ca^{2+}$, ions, etc., is still not understood. Until now it is assumed that higher TIC and higher $Ca^{2+}$, concentration are detrimental to removal of uranium. It is however assumed that higher concentrations of carbonate ions and/or calcium ions are detrimental to the removal of uranium.

While studies have been undertaken to further optimize uranium removal from water, there still exists a need for further lowering the levels of uranium sources in water, particularly potable water and/or drinking water.

SUMMARY OF THE INVENTION

The inventors have found a process in which a further large reduction in amounts of uranium sources in water can be achieved by using a specific combination of reagents in process steps. Particularly, the inventors found that an addition of an iron(III) salt and a powder comprising an alkaline earth carbonate, optionally (ii) an alkaline earth compound chosen from a chloride and/or a nitrate compound, (iii) at least one alkali metal hydrogen carbonate, and optionally (iv) an alkali metal carbonate at a suitable pH achieves a surprising lowering of a uranium source in water, while each of these individually does not achieve anywhere near such effect. Also, the inventors found that Ca and carbonate ions, which according to the state of the art has negative effects on removing a uranium source, particularly uranyl cations, from a water, did not influence this process, as both ions were added with the powder. This is even the case if both $Ca^{2+}$ and total inorganic carbon (TIC) are increased. The inventors found instead that carbonate and $Ca^{2+}$, worked synergistically in removing the uranium.

In a first aspect the present invention relates to a method of removing a uranium source from a water, comprising a) providing a water comprising a uranium source;

b) optionally regulating the pH of the water comprising a uranium source to be in a range between and including 4.5 and <7.0;

c) adding an iron(III) salt, e.g. an aqueous solution of an iron(III) salt, to the water comprising the uranium source;

d) adding a powder to the water, wherein the powder comprises (i) an alkaline earth carbonate, optionally (ii) an alkaline earth compound chosen from a chloride and/or a nitrate compound, (iii) at least one alkali metal hydrogen carbonate, and optionally (iv) an alkali metal carbonate, and forming a precipitate comprising the uranium source; and e) removing the precipitate comprising the uranium source.

Furthermore disclosed is a kit for removing a uranium source from a water, comprising, in separate containers:

an iron(III) salt, particularly an aqueous solution of the iron(III) salt; and a powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate.

In addition, the invention relates to the use of a powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate in a method of removing a uranium source from a water.

Further aspects and embodiments of the invention are disclosed in the dependent claims and can be taken from the following description, figures and examples, without being limited thereto.

BRIEF DESCRIPTION OF THE DRAWINGS

The enclosed drawings should illustrate embodiments of the present invention and convey a further understanding thereof. In connection with the description they serve as explanation of concepts and principles of the invention. Other embodiments and many of the stated advantages can be derived in relation to the drawings. The elements of the drawings are not necessarily to scale towards each other. Identical, functionally equivalent and acting equal features and components are denoted in the figures of the drawings with the same reference numbers, unless noted otherwise.

DETAILED DESCRIPTION OF THE PRESENT INVENTION

Definitions

Figure 1:
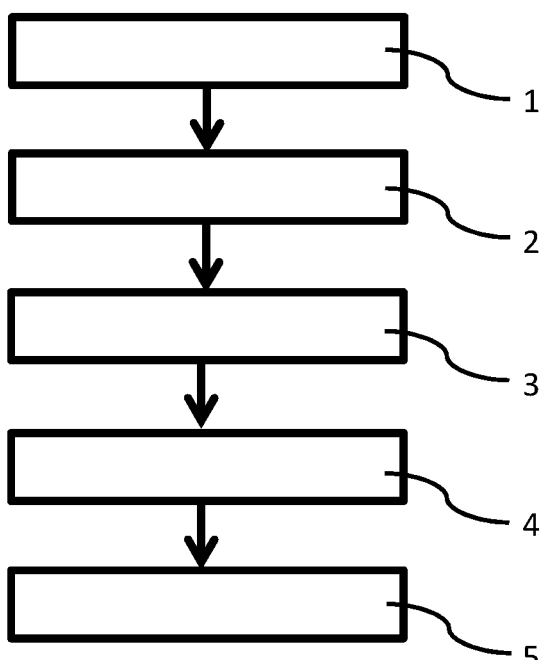
FIGS. 1 and 2 show schematically exemplary methods of the present invention.

Unless defined otherwise, technical and scientific terms used herein have the same meaning as commonly understood by one of ordinary skill in the art to which this invention belongs.

Within the scope of the invention a uranium source is not particularly limited, as long as it is in a water. Particularly, the uranium source is dissolved in the water, i.e. is a soluble uranium compound or ion, etc. A usual source of uranium in a water is e.g. a uranyl cation, particularly the uranyl(VI)-ion $UO_2^{2+}$, as well as complex uranium compounds and ions like $UO_2(OH)_2$, $UO_2(CO_3)_2^{2-}$, $UO_2(CO_3)_3^{4-}$, and $UO_2(OH)_4^{2-}$. With the present method and kit particularly uranyl(VI) cations $UO_2^{2+}$ and/or complexes thereof can be at least partially removed, but it is not excluded that other uranium containing species which may be present in solution due to equilibrium reactions, etc., are at least partially removed.

While with the present kit and in the present method a uranium source can be removed in a water, it is not necessary to remove all of the uranium source, i.e. have a quantitative removal, but only remove some of the uranium source, e.g. reduce the amount thereof below a certain intended value before continuing providing it to e.g. a consumer. Particularly, in the present method the amount of at least one soluble uranium source in the water is lowered, and further particularly the total amount of soluble uranium compounds and/or ions is lowered in the water.

Amounts within the present invention are given in wt. %, unless stated otherwise or clear from context.

Before the invention is described in exemplary detail, it is to be understood that this invention is not limited to the particular component parts of the process steps of the methods described herein as such methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise. For example, the term "a" as used herein can be understood as one single entity or in the meaning of "one or more" entities. It is also to be understood that plural forms include singular and/or plural referents unless the context clearly dictates otherwise. It is moreover to be understood that, in case parameter ranges are given which are delimited by numeric values, the ranges are deemed to include these limitation values.

A first aspect of the present invention relates to a method of removing a uranium source from a water, comprising
- a) providing a water comprising a uranium source;
- b) optionally regulating the pH of the water comprising a uranium source to be in a range between and including 4.5 and <7.0;
- c) adding an iron(III) salt, e.g. an aqueous solution of an iron(III) salt, to the water comprising the uranium source;
- d) adding a powder to the water, wherein the powder comprises (i) an alkaline earth carbonate, optionally (ii) an alkaline earth compound chosen from a chloride and/or a nitrate compound, (iii) at least one alkali metal hydrogen carbonate, and optionally (iv) an alkali metal carbonate, and forming a precipitate comprising the uranium source; and

- e) removing the precipitate comprising the uranium source.

Particularly, the steps in the present method are carried out in the order given, i.e. a), b), c), d), e). Also, particularly uranyl ($UO_2^{2+}$) cations are removed from the water.

In the present method, it is not excluded that—apart from steps a) to e), also further steps are carried out. According to certain embodiments, no additional steps are carried out between two or more of these steps, though, e.g. between step a) and step b), between step b) and step c), between step c) and step d), and/or between step d) and step e). It is also not excluded that further steps are carried out after step e).

In the present method, step a) of providing a water comprising a uranium source is not particularly restricted. The water can be from any source and can be natural water, mineral water, potable water, drinking water, mining effluents, ground water, open pit mine lakes, fertilizer production, effluents from fertilized areas, etc., and is particularly drinking water or water from fertilizer production, e.g. production of phosphorous-containing fertilizer, e.g. phosphate fertilizer. The provision of the water is also not particularly restricted and it can be flown continuously or discontinuously. Also the whole method can be done in a continuous or discontinuous flow, or only some of the steps are carried out continuously, while other steps are carried out discontinuously. It is also possible to only provide a part of a water source in the present method, while not treating the other part of the method, i.e. separate a water source in two or more different streams, and only carry out the present method on a part of the different streams, e.g. one stream, e.g. in the form of a side stream. Afterwards, the different streams can be combined again, so that one stream contains the original amount of the uranium source, while a stream treated by the present method has a uranium source removed at least in part, so that after uniting the streams the resulting stream has still a reduced amount of the uranium source compared to the original water. This way reagents in the present method can be saved, while still a satisfactory amount of uranium source, e.g. below a given limit, can be achieved. Also, treatment of partial streams can be carried out more effectively due e.g. to better contacting with the different reagents, etc.

Step b) of optionally regulating the pH of the water comprising a uranium source to be in a range between and including 4.5 and <7.0 is also not particularly restricted and is an optional step. According to preferred embodiments, step b) is carried out, though. According to preferred embodiments, the pH is regulated to be in a range between and including 5.0 and <7.0, further preferably between and including 5.2 and 6.8, even further preferably between and including 5.4 and 6.6, more preferably between and including 5.6 and 6.4, particularly between and including 5.7 and 6.3, e.g. to between and including 5.8 and 6.2, e.g. between 5.9 and 6.1, e.g. about 6.0. For this purpose, the pH of the water can be suitably measured before step b). It has been surprisingly found that the setting of a slightly acidic pH is favorable for the following steps c) and d), particularly also step d).

The regulation of the pH of the water is not particularly restricted and can be carried out by adding a suitable reagent for setting the suitable pH, e.g. an acid or a base, depending on the starting pH. According to certain embodiments, the pH of the water is measured before adding a suitable reagent and then choosing a suitable reagent based on the measured pH. If the pH is too basic, at least an acid is added, particularly a mineral acid, further particularly a non-oxidizing mineral acid. If the pH is too acidic, then at least a base is added, e.g. a an alkali metal hydroxide solution or an alkaline earth metal hydroxide solution, preferably a solution of NaOH.

According to certain embodiments, step b) of regulating the pH of the water comprising a uranium source comprises:

b-i) measuring the pH of the water comprising the uranium source, and b-ii) adding an acid, particularly an aqueous solution of the acid, to the water comprising the uranium source, preferably wherein the acid is an inorganic acid, particularly aqueous hydrochloric acid and/or aqueous sulfuric acid. Particularly preferably aqueous HCl is applied in step b). The concentration of the acid in the aqueous solution is not particularly restricted and can be between and including 0.5 and 40% w/w, preferably between and including 0.8 and 35% w/w, further preferably 1 and 30% w/w, e.g. between and including 3 and 25% w/w, between and including 5 and 20% w/w, e.g. between and including 7.5 and 15% w/w, e.g. about 10% w/w.

The addition of a suitable reagent, e.g. at least one acid is carried out until a suitable pH is achieved in step b), which can be controlled by suitable pH measurement, e.g. using a continuous pH measurement setup, after the addition thereof, e.g. in continuous or discontinuous flow.

The optional step b) is particularly carried out if the water in step a) has an alkaline pH, i.e. >7.0, or has a pH of 7.0. As this is usually the case for most water sources, step b) is carried out according to certain embodiments. However, in case the pH is acidic, i.e. below 7.0, particularly at 6.0 or below, step b) can also be omitted. When the water is too acidic, a base can be added, as described above. Furthermore, it is also to be considered that a further lowering of the pH can be obtained in step d) due to addition of the iron(III) salt, so that starting from an acidic pH after step a) is less problematic. With the setting of the pH in step b), an equilibrium of the uranium source in the water can be suitably set so that the uranium source is predominantly present in a form that can suitably react with the substances in steps c) and/or d).

Furthermore, step c) of adding an iron(III) salt, e.g. an aqueous solution of an iron(III) salt, to the water comprising the uranium source is also not particularly restricted. The inventors found that the iron(III) salt is particularly useful when the powder in step d) is added, particularly subsequently. While the iron(III) salt is not particularly restricted, the use of a suitably water soluble iron(III) salt is preferred. According to certain embodiments, the iron(III) salt is iron(III) chloride and/or iron(III) sulfate, preferably iron(III) chloride. Particularly, the aqueous solution of the iron(III) salt is suitably diluted. Particularly the inventors found that the effect of lowering the amount of the uranium source can be achieved when the iron(III) ions are added in step c) prior to adding the powder in step d).

According to certain embodiments, the iron(III) salt, particularly iron(III) chloride, is added in an amount of 1 to 100 mg/L water, preferably 2 to 50 mg/L water, more preferably 2 to 25 mg/L water, further preferably 3 to 20 mg/L water, even further preferably 8 to 19 mg/L water, particularly preferably 14 to 18 mg/L water, e.g. 15 to 17.5 mg/L, e.g. 16 to 17 mg/L, e.g. about 17 mg/L. This means that the iron(III) salt is added in such an amount that a final concentration of 1 to 100 mg iron ions per L water to be treated in the method is obtained, preferably 2 to 50 mg iron ions per L water, more preferably 2 to 25 mg iron ions per L water, further preferably 3 to 20 mg iron ions per L water, even further preferably 8 to 19 mg iron ions per L water, particularly preferably 14 to 18 mg iron ions per L water, e.g. 15 to 17.5 mg iron ions per L water, e.g. 16 to 17 mg iron water ions per L, e.g. about 17 mg iron ions per L water. Particularly, it has also been found that with such concentrations also the amount of counter-ion of the salt, e.g. a chloride and/or sulfate ion, can be tolerated and does not disturb the reaction.

According to certain embodiments, an aqueous solution of the iron(III) salt is prepared for addition to the water, particularly in situ. Surprisingly, improved results were obtained with such an in situ prepared solution. Without being bound by any theory, it is assumed that this enhances formation of Fe(III)-containing colloids in the water to be treated.

Further, the inventors particularly found improved results when step c) is carried out before step d), and particularly after step b). Without being bound by theory, it is assumed that the iron(III) ion is able to form suitable hydroxide colloids at a suitable pH that positively affect the subsequent removal of uranium. In this regard the inventors noted that the colloids will have a negative surface charge at a pH 6, which seems to positively affect the uranium precipitation, while at pH 8 a positive surface charge is present for the iron hydroxide colloids. The charge zero should be around pH 7 for the colloids. Also, no such effect was observed with Fe(II) ions, which are deemed too water soluble. It has also been found that if step c) is carried out after step b), a further decrease of the pH may be obtained, and a suitable pH after step c) may be in the range between 5 and 6, e.g. between 5.2 and 5.8, and a target pH after step c) may be e.g. 5.5.

Also step d) of adding a powder to the water, wherein the powder comprises (i) an alkaline earth carbonate, optionally (ii) an alkaline earth compound chosen from a chloride and/or a nitrate compound, (iii) at least one alkali metal hydrogen carbonate, and optionally (iv) an alkali metal carbonate, and forming a precipitate comprising the uranium source is not particularly restricted. According to certain embodiments, at least a calcium salt is present as compound (i) and/or optional compound (ii). Particularly, step d) is carried out after step c). According to preferred embodiments, the powder is added in step d) in a dry state, i.e. without water or any other solvent. In this respect it is preferred to apply the powder via a device that can keep it dry as components thereof may be hygroscopic. Without being bound by any theory, it is assumed that the addition of the dry powder enhances a formation of an Fe(III)-containing colloid which functions in adsorbing and/or binding the uranium source. Particularly, if an alkaline earth compound chosen from a chloride and/or a nitrate compound, particularly an alkaline earth chloride is present, it seems that this leads to an oversaturation and a kinetic effect regarding the formation of the precipitate. Particularly preferable as alkaline earth compound in this regard is calcium chloride, free of water, as hemihydrate and/or as dihydrate, whereas higher hydrates like the hexahydrate are less preferable, probably due to the increased amount of water in the molecule. Addition of the dry powder can be suitably done via a suitable application device, e.g. a dosing unit.

In step d) a powder is added comprising (i) an alkaline earth carbonate, optionally (ii) an alkaline earth compound chosen from a chloride and/or a nitrate compound, (iii) at least one alkali metal hydrogen carbonate, and optionally (iv) an alkali metal carbonate. While it is not excluded that other components, e.g. a trickling aid, may be contained, it is preferred that the powder consists of (i) at least one alkaline earth carbonate, optionally (ii) at least one alkaline earth compound chosen from a chloride and/or a nitrate compound, (iii) at least one alkali metal hydrogen carbonate, and optionally (iv) at least one alkali metal carbonate, apart from unavoidable impurities. According to preferred embodiments, the powder in step d), as well as in the present kit and the present use, contains component (iv), i.e. at least one alkali metal carbonate, and according to particularly preferred embodiments, the powder in step d), as well as in the present kit and the present use, contains components (ii) and (iv), i.e. an alkaline earth compound chosen from a chloride and/or a nitrate compound, particularly an alkaline earth chloride, and at least one alkali metal carbonate.

In the powder in step d), as well as in the present kit and the present use, component (i) is not particularly restricted as long as it is an alkaline earth carbonate, e.g. magnesium carbonate, calcium carbonate, strontium carbonate and/or barium carbonate. Preferably component (i) is magnesium carbonate and/or calcium carbonate, particularly preferably calcium carbonate.

In the powder in step d), as well as in the present kit and the present use, optional component (ii) is not particularly restricted as long as it is an alkaline earth compound chosen from a chloride and/or a nitrate compound, preferably magnesium chloride, calcium chloride, magnesium nitrate and/or calcium nitrate, further preferably calcium chloride and/or calcium nitrate, particularly preferably calcium chloride, particularly preferably calcium chloride, free of water, as hemihydrate and/or as dihydrate.

In the powder in step d), as well as in the present kit and the present use, component (iii) is not particularly restricted as long as it is an alkali metal hydrogen carbonate, e.g. lithium hydrogen carbonate, sodium hydrogen carbonate (sodium bicarbonate), and/or potassium hydrogen carbonate, and preferably is sodium hydrogen carbonate, optionally mixed with potassium hydrogen carbonate.

In the powder in step d), as well as in the present kit and the present use, optional component (iv) is not particularly restricted as long as it is an alkali metal carbonate, e.g. lithium carbonate, sodium carbonate (soda ash), potassium carbonate, and preferably is sodium carbonate. If magnesium carbonate and/or calcium carbonate is used as component (i) in the powder, it seems that compound (iv) is not necessary to be included. If it is included an enhanced formation of a precipitate seems to be achieved, though.

In step d), as well as in the present kit and the present use, a preferable powder comprises at least calcium carbonate and sodium hydrogen carbonate, a further preferable powder comprises at least calcium carbonate, sodium hydrogen carbonate and sodium carbonate, and a particularly preferable powder comprises calcium chloride, calcium carbonate, sodium hydrogen carbonate and sodium carbonate.

In step d), as well as in the present kit and the present use, an exemplary powder consists of calcium carbonate, sodium hydrogen carbonate and sodium carbonate, and a particularly preferable powder consists of calcium chloride, calcium carbonate, sodium hydrogen carbonate and sodium carbonate.

Without wishing to be bound to any theory, it is assumed that the powder added in step d) allows adjusting a suitable pH for maximizing interaction of the uranium source, which according to the equilibrium in water should be at a pH of about 6 to 7. By addition of an alkaline earth ion, particularly calcium ions, and carbonate ions, respectively, the lime-carbonic acid-equilibrium of the water to be treated can be actively influenced. Particularly the processes of deacidification, hardening, remineralisation and other equilibria in the water can be individually controlled in this way. In particular, solving and dissolving of calcite may happen in parallel in such case at high reaction speed. Dissolving in step d) particularly preferably occurs in a fast ionic reaction. Oversaturation can be avoided by adding of crystals, so that the addition of a powder is preferable. Immobilization of uranium species can the occur on iron compounds formed, which then can be separated.

In contrast to the method of removing uranium disclosed in DE 43 13 127 A1, particularly dosing of a powder in present step d) achieves a totally different effect. It was surprisingly found that not only does the addition of basic substances like $Ca(OH)_2$ achieves a difference in kinetics and thermodynamics, particularly with regard to the saturation index of the species involved, but also an effect on the final product can be observed. While the saturation index is first negative for $CO_2$ when using milk of lime and only gets positive later for calcium, using the mixture of components in step d) leads to a positive saturation index for $CO_2$ when introducing the mixture, particularly as powder, and at some point a thermodynamic equilibrium is reached (saturation index for $CO_2$ and calcium both being 0). This thermodynamic equilibrium is different from any process in regard to chemical potential to a process using milk of lime, as in DE 43 13 127 A1, where uranium removal seems to be based on precipitation with phosphates. Details of the two different processes remain unclear. However, it was observed that uranium complexes get re-dissolved in a basic medium with hydroxide species, so that the process in DE 43 13 127 A1 is disadvantageous. Thus, setting of a suitable pH before step d) is advantageous.

According to certain embodiments, the molar ratio of components (i) and (ii)—if present—in step d) is in a range of from 1:2 to 1:6; and/or component (iv), if present, is present in an amount of up to 200 mol % in relation to the molar amount of component (iii). According to certain embodiments, the molar ratio of component (i) to component (ii) to component (iii) to component (iv) is in a range of 1:0:2:0 to 1:6:7:10. According to certain embodiments, the molar ratio of component (i) to component (ii) to component (iii) to component (iv) is in a range of 1:2:2:3 to 1:6:7:10, preferably 1:3:4:6 to 1:5:6:9, further preferably 1:4:4.5:8 to 1:5:5.5:8.5, and or is in a range of 1:0:2:3 to 1:0:6:10, preferably 1:0:2.5:4 to 1:0:5:8, further preferably 1:0:3:5 to 1:0:4:6.

According to certain embodiments, the powder in step d) is added in an amount of 20 to 500 mg/L water, preferably 35 to 350 mg/L water, further preferably 55 to 190 mg/L water, even further preferably 70 to 150 mg/L water, particularly preferably 80 to 120 mg/L water, e.g. 100 mg/L water, i.e. in such a way that the given concentration is obtained in the water to be treated.

According to certain embodiments, after step d) the water is allowed to react for a certain residence time of e.g. between 10 seconds and 15 hours, e.g. between 30 seconds and 12 hours, e.g. between 1 minute and 11 hours, e.g. between 5 minutes and 10 hours, e.g. between 10 minutes and 6 hours, e.g. between 30 minutes and 3 hours, e.g. about 1 hour. According to certain embodiments, the water is allowed to react for a certain residence time, e.g. at least 30 minutes, particularly at least 1 hour after step d). Through the residence time a good formation of a precipitate is obtained. However, it is not excluded that no residence time is allowed for a reaction, e.g. in a flow-through case, although in most cases even then a certain "residence time", respectively time, will be available for reacting until the next step is reached. Differences in reactor design, etc., thereby seem to have no drastic effect on the uranium removal, whereas a sufficiently long residence time is advantageous, as observed in preliminary experiments.

According to certain embodiments, an alkaline substance or alkaline solution is added after step d), particularly after the water is allowed to react for a certain residence time, e.g. as given above). The alkaline substance is not particularly restricted. According to certain embodiments the alkaline substance is $Ca(OH)_2$, NaOH and/or KOH, preferably $Ca(OH)_2$ and/or NaOH, further preferably $Ca(OH)_2$, and the alkaline solution is an aqueous solution of $Ca(OH)_2$, NaOH and/or KOH, preferably $Ca(OH)_2$ and/or NaOH, further preferably $Ca(OH)_2$. According to certain embodiments, the alkaline substance or alkaline solution is added in such a manner that the concentration thereof is between and including 1 and 500 mg/L, e.g. between and including 5 and 500 mg/L, e.g. between and including 10 and 500 mg/L, e.g. between and including 20 and 500 mg/L water to be treated, e.g. between and including 50 and 300 mg/L water to be treated, e.g. between and including 70 and 200 mg/L water to be treated, e.g. between and including 100 and 150 mg/L water to be treated. With this alkaline substance and/or alkaline solution the pH can be shifted again, enabling further bonding and/or adsorption of a uranium species. However, care should be taken that a suitable pH is set for the water after the treatment, e.g. in the case of potable or drinking water.

When the alkaline substance or alkaline solution is added, it is particularly preferable that the carbonate hardness of the water is as low as possible, preferably below 1 mmol/L, further preferably below 0.5 mmol/L.

According to certain embodiments, it is preferred that the water is not turning basic before step e).

In the forming of the precipitate it is not necessary that the uranium source is bound to the precipitate, and a simple adsorption to the precipitate is sufficient as well. Thus, the precipitate comprises the uranium source, but it is not necessary that it forms a chemical bond with components of the precipitate. The inventors found that both a precipitation as well as an adsorption due to the heterogeneous surface of the complex formed in step d) is possible, but the actual mechanism of uranium removal may still be influenced also by further parameters. Adsorption and/or bonding is assumed, however, to be influenced by the surface of colloidal iron hydroxide formed, with the neutral species $Fe_{III}(OH)_3$ being present in a pH range between a pH of approximately 5 and 11 with a maximum at a pH of about 8, and the positively charges species $Fe_{III}(OH)_2^+$ being present at a pH between about 2 and about 9, with a maximum at a pH of about 5, showing that in the pH range set in the present method not only complex uranium chemistry influences the formation of the precipitate, but also the complex iron(III) chemistry. Due to the complex chemistry with different Fe(III) phases, e.g. Fe(III) hydroxide phases, as well as the presence of further species from the added powder, particularly also carbonate ions, it is not excluded that the forming of the precipitation at least also includes an adsorption of the uranium source, e.g. in the form of a complex ion, as well as also a co-precipitation and/or precipitation thereof, depending on the particular complex formed by the uranium source, the number being manifold at the given pH.

Furthermore the removing of the precipitate comprising the uranium source in step e) is not particularly restricted. For example, removing of the precipitate is possible by filtration, flotation, etc. According to certain embodiments, the water is not adjusted to a basic pH before step e).

According to certain embodiments, step e) comprises a filtration, particularly through a membrane filter and/or a sand filter. According to certain embodiments, the sand filter is made of filter gravel with a granulation of 0.1 to 1.2 mm, preferably 0.2 to 1.0 mm, further preferably 0.4 to 0.8 mm. According to certain embodiments, the membrane filter has a pore size in the range of 0.10 to 0.70 μm, preferably 0.15 to 0.63 μm, further preferably 0.22 to 0.45 μm.

According to certain embodiments, a flocculation aid is added prior to step e). The flocculation aid is not particularly restricted. For example polyelectrolytes, e.g. anionic polyelectrolytes like Praestol® 2530 TR can be applied as flocculation aid.

According to certain embodiments, the pH of the water can be suitably adjusted, e.g. to a pH around pH 7, after step e), e.g. using NaOH or an aqueous NaOH solution. It has been surprisingly found that the addition of NaOH or an aqueous NaOH solution and setting of a basic pH before step e) can lead to re-dissolving of the uranium species. Thus, according to certain embodiments, dosing of a base like NaOH or an aqueous NaOH solution is—according to certain embodiments—carried out after step e) of removing the precipitate. While it was generally assumed that a neutralization is advantageous for precipitation of Fe(III) species, it has been surprisingly found that for uranium removal an acidic pH is advantageous.

In case the water is very muddy, it is preferred to comprise a removal step for solids prior to step a) to avoid side reactions with the mud. This is not particularly restricted and can e.g. comprise a floatation, filtration, etc.

Figure 2:
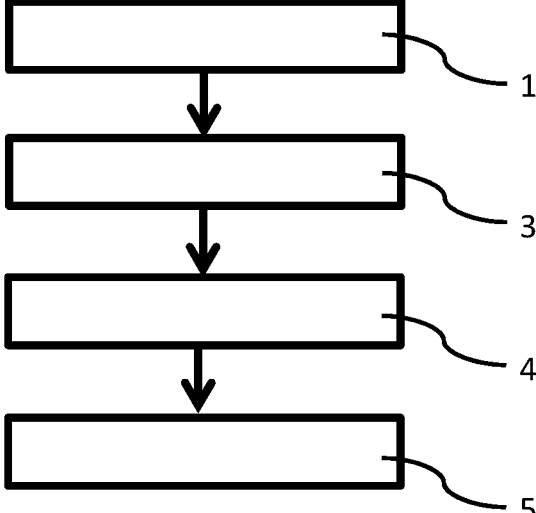

An exemplary method of the invention is shown schematically in FIG. 1. Following a step 1 of providing a water comprising a uranium source, in step 2 the pH of the water comprising a uranium source is regulated to be in a range between and including 4.5 and <7.0. Thereafter comes step 3 of adding an iron(III) salt, e.g. an aqueous solution of an iron(II) salt, to the water comprising the uranium source, and subsequently a step 4 of adding a powder to the water, wherein the powder comprises (i) an alkaline earth carbonate, optionally (ii) an alkaline earth compound chosen from a chloride and/or a nitrate compound, (iii) at least one alkali metal hydrogen carbonate, and optionally (iv) an alkali metal carbonate, and forming a precipitate comprising the uranium source. After this the precipitate comprising the uranium source is removed in step 5. A further exemplary method of the invention is schematically shown in FIG. 2, wherein step 2 is omitted, which is e.g. the case if the water already has a suitable pH, as described above.

Further disclosed is a kit for removing a uranium source from a water, comprising, in separate containers:

an iron(III) salt, particularly an aqueous solution of the iron(III) salt; and a powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate.

The kit can be particularly used in the present method. Thus, embodiments described with regard to the components of the kits above in connection with the present method also can be applied to the present kit, and vice versa, particularly with regard to the iron(III) salt and the powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate.

The invention further relates to the use of a powder comprising (i) an alkaline earth carbonate, (ii) an alkaline earth compound chosen from a chloride and/or a nitrate compound, (iii) at least one alkali metal hydrogen carbonate, and optionally (iv) an alkali metal carbonate in a method of removing a uranium source from a water.

Particular embodiments of the powder are described with regard to the present method and kit above and also apply to the present use.

The above embodiments can be combined arbitrarily, if appropriate. Further possible embodiments and implementations of the invention comprise also combinations of features not explicitly mentioned in the foregoing or in the following with regard to the Examples of the invention. Particularly, a person skilled in the art will also add individual aspects as improvements or additions to the respective basic form of the invention.

EXAMPLES

The present invention will now be described in detail with reference to several examples thereof. However, these examples are illustrative and do not limit the scope of the invention.

For treating a water containing a uranium source, different treatment examples were conducted.

General Experimental Setup

Water was provided containing a uranium source. The water was pumped through a treatment system that has a first inlet where a solution can be added to regulate a pH thereof, a second inlet where a solution containing an iron salt can be added, a third inlet in which a powder for treating can be added, and a fourth inlet to which an alkaline solution can be added. Thereafter, a precipitate was settled in a settling tank, and a sample was taken from the supernatant solution, filtered through a ROTILABO® tape 12A filter, and the filtrate was analyzed, particularly also for remaining uranium.

After each possible addition of a component in the first to fourth inlet, the water was flown into a respective tank where it was allowed to remain for a certain reaction/residence time. In case no substance was added from the respective inlet, the water was also retained in the tanks for better comparability of the results. After a possible addition of the iron salt solution, the water was flown into a container where it was allowed to be retained for a residence time of about 7 minutes. For possibly adding the powder from the third inlet, it was added to a tank wherein the water was mixed with the powder for a residence time of 30 minutes using a stirrer. After this mixing, the water was sent to a further reactor where it was retained for about 1 hour. The water was flown through the system at a pumping speed of 1000 L/h and at a temperature of 7-16° C. At the end the water was flown through a filter. After the filter samples were taken from the treated water and the amount of uranium remaining therein was measured.

For regulating a pH of 6 in the respective examples, an aqueous 2N solution of HCL was added at 1.48 mL/L to achieve a final pH of 6.01, for setting a pH of 7 an aqueous 2N solution of HCl was added at 0.34 mL/L to achieve a final pH of 6.98, and for setting a pH of 8 an aqueous 2N solution of NaOH was added at 0.14 mL/L to achieve a final pH of 8.01.

For adding an iron salt, the following solutions were prepared in situ.

As an Fe(II) solution, iron(II) sulfate hexahydrate was weighed in and mixed with water, denominated Fe(II) in the following.

As an Fe(III) solution, iron(III) chloride hexahydrate was weighed in and mixed with water, denominated Fe(III) in the following. Generally, when adding the Fe(III) salt, the pH was subsequently lowered.

As powder to be added, two powder mixtures were prepared, a Mix 1 and a Mix 2. The composition of each mix was as follows:

Mix 1 (per 100 g): calcium chloride (as semi hydrate $CaCl_2+0.5\ H_2O$) 32 g, sodium carbonate 43 g, sodium hydrogen carbonate 20 g, calcium carbonate 5 g Mix 2 (per 100 g): sodium carbonate 60 g, sodium hydrogen carbonate 30 g, calcium carbonate 10 g After a possible addition of the powder of Mix 1, the pH was raised. For example when a first pH was set to 6, the pH was lowered to 5.1 when the Fe(III) salt was added at 17 mg/L water to be treated, and was raised to 5.6 after addition of 100 mg/L of the powder of Mix 1.

If $Ca(OH)_2$ or NaOH is added as alkaline solution from the fourth inlet, it is added to achieve a final pH after the addition between 8 and 9.

Reference Example 1

As a reference, water was pumped through the system, filtered and then the supernatant measured for uranium.

Comparative Examples 1 to 8 (CE 1-8)

Compared to the reference example, in comparative example 1, additionally the solution of the Fe(II) salt was added at 17 mg/L water to be treated, in comparative example 2 additionally the solution of the Fe(III) salt was added at 17 mg/L water to be treated, in comparative example 3 additionally the powder Mix 1 was added at 100 mg/L water to be treated, in comparative examples 4 to 6 the Fe(II) solution was added as in CE1 as well as the Mix 1 as in CE3 after different pH values were initially set (pH 6, 7, 8), and in comparative examples 7 and 8 the Fe(III) solution was added as in CE2 as well as the Mix 1 as in CE 3 after initial pH values of 7 and 8 were adjusted.

Examples 1 to 13

In Examples 1 and 2, the initial pH was adjusted to 6, then the Fe(III) solution was added at 17 mg/L water to be treated, followed by adding the Mix 1 as powder at 100 mg/L water to be treated, reacting, settling and filtering as described above.

Example 3 corresponds largely to Examples 1 and 2, except that the Fe(III) solution was added to achieve a concentration of 10 mg/L water to be treated.

In Example 4 additionally the $Ca(OH)_2$ solution was added after the reacting in comparison to Example 3, and Example 5 corresponds largely to Example 4, except that the concentration of the powder Mix 1 was adjusted to achieve 150 mg/L water to be treated.

Example 6 corresponds largely to Example 3, expect that the concentration of the Fe(III) solution was raised to 14 mg/L water to be treated.

Example 7 corresponds largely to Examples 1 and 2, except that Mix 2 was used instead of Mix 1.

Example 8 is corresponds largely to Example 7. However, after reacting, the $Ca(OH)_2$ solution is additionally added.

Examples 9 to 11 correspond largely to Examples 1 and 2, except that also, after reacting, the $Ca(OH)_2$ solution is additionally added.

Example 12 corresponds to Examples 9 to 11, except that the concentration of the powder Mix 1 was adjusted to achieve 150 mg/L water to be treated.

Example 13 corresponds to Examples 9 to 11, except that the NaOH solution was used instead of the $Ca(OH)_2$ solution.

The results of the obtained uranium concentration after filtration as well as the possible initial pH setting, possible addition of an Fe salt, the type thereof as well as its concentration, the type of powder possibly added and the possible addition of a $ca(OH)_2$ solution for reference example 1 (ref. 1), comparative examples 1 to 8 (CE 1-8) and Examples 1 to 8 (1-8) are given in the following table 1.

TABLE 1

| Example No. | pH setting | Fe salt | c (Fe salt) [mg/L] | powder | alkaline substance | c (U) [mg/L] |
|---|---|---|---|---|---|---|
| Ref. 1 | — | — | — | — | — | 0.0190 |
| CE 1 | — | Fe(II) | 17 | — | — | 0.0180 |
| CE 2 | — | Fe(III) | 17 | — | — | 0.0140 |
| CE 3 | — | — | | Mix 1 | — | 0.0170 |
| CE 4 | 6 | Fe(II) | 17 | Mix 1 | — | 0.0180 |
| CE 5 | 7 | Fe(II) | 17 | Mix 1 | — | 0.0180 |
| CE 6 | 8 | Fe(II) | 17 | Mix 1 | — | 0.0180 |
| 1 | 6 | Fe(III) | 17 | Mix 1 | — | 0.0025 |
| 2 | 6 | Fe(III) | 17 | Mix 1 | — | 0.0031 |
| CE 7 | 7 | Fe(III) | 17 | Mix 1 | — | 0.0140 |
| CE 8 | 8 | Fe(III) | 17 | Mix 1 | — | 0.0160 |
| 3 | 6 | Fe(III) | 10 | Mix 1 | — | 0.0085 |
| 4 | 6 | Fe(III) | 10 | Mix 1 | Ca(OH)2 | 0.0075 |
| 5 | 6 | Fe(III) | 10 | Mix 1* | Ca(OH)2 | 0.0084 |
| 6 | 6 | Fe(III) | 14 | Mix 1 | — | 0.0076 |
| 7 | 6 | Fe(III) | 17 | Mix 2 | — | 0.0060 |
| 8 | 6 | Fe(III) | 17 | Mix 2 | Ca(OH)2 | 0.0052 |
| 9 | 6 | Fe(III) | 17 | Mix 1 | Ca(OH)2 | 0.0016 |
| 10 | 6 | Fe(III) | 17 | Mix 1 | Ca(OH)2 | 0.0005 |
| 11 | 6 | Fe(III) | 17 | Mix 1 | Ca(OH)2 | 0.0008 |
| 12 | 6 | Fe(III) | 17 | Mix 1* | Ca(OH)2 | 0.0049 |
| 13 | 6 | Fe(III) | 17 | Mix 1 | NaOH | 0.0011 |

*150 mg/L Mix 1

From Table 1 it is clear that the sole addition of an Fe(II) salt (CE 1) or the addition thereof and Mix 1 did not result in a significant lowering of the uranium concentration, even when different initial pH levels were set (CE 4-6). Also the sole addition of the Fe(III) salt solution (CE 2) and the sole addition of Mix 1 (CE 3) did not achieve a big reduction in the uranium concentration. Furthermore, the addition of the Fe(III) salt solution and Mix 1 did not achieve a sufficient lowering of uranium levels when the initial pH was at 7 or 8 (CE 7 and 8).

In contrast, a significant lowering of the uranium level was achieved with the addition of the Fe(III) salt and Mix 1 (Examples 1, 2, 3 and 6) after an initial pH setting to 6, wherein the addition of the Fe(III) salt at 17 mg/L achieved better results than an addition at 10 and 14 mg/L, respectively. For the addition at 10 mg/L Fe(III) salt, enhanced removal of uranium was obtained with a final addition of $Ca(OH)_2$ (Examples 4 and 5), wherein improved results were obtained when Mix 1 was added at 100 mg/L (Example 4) compared to when it was added at 150 mg/L (Example 5). A lesser improving of the uranium levels was obtained when Mix 2 was used instead of Mix 1 (Examples 7 and 8 compared to Example 1 and Examples 9 to 11, respectively). The best results were obtained when the initial pH was adjusted to 6, the Fe(III) salt was added at 17 mg/L, Mix 1 was added at 100 mg/L, and finally $Ca(OH)_2$ or NaOH was added (Examples 9 to 11 and 13). Again, an increase of the amount of Mix 1 to 150 mg/L (Example 12) achieved less favorable results for the uranium concentration lowering.

With the present method, kit and use an improved removal of a uranium source in water can be achieved. Surprisingly it has been found that total inorganic carbon and the presence of Ca ions did not result in a negative effect, contrary to the findings in the state of the art.

Example 14

Raw water with an iron content of 1.21 mg/L and a uranium content of 14.8 μg/L was introduced into a tank (volume of about 500 L) at 1 m³/h. The pH thereof was reduced to pH 6.0 using aqueous HCL (35%) in an amount of 400 mL/m³. Further, an aqueous iron chloride solution, produced in situ as above, with about 17 g/m³ Fe (reduction of pH to 5.5) was introduced at 360 mL/m³ iron(III) chloride solution (corresponding to 12.4 g/m³ Fe and 23.6 g/m³ Cl ions). 100 g/m³ of Mixture 1, as above, was dosed via a vibratory feeder and left for reaction for a retention time of about 30 minutes. After a sand filtration and removal of the uranium species to a remaining concentration of uranium of 2.11 μg/L and a remaining concentration of Fe of 1.23 mg/L, the pH was adjusted again to pH 6 using aqueous NaOH (35%) (550 mL/m³) for reintroducing water.

Example 15

Example 15 was carried out as Example 14, except that NaOH was added before the sand filtration.

While the pH was 5.63 after addition of iron(III) chloride (uranium concentration 14.8 μg/L), it was 7.29 after addition of the NaOH (uranium concentration 16.4 μg/L), and 7.41 after filtration (uranium concentration 16.9 μg/L). While an efficient uranium removal was observed with the addition of the iron(III) chloride and Mix 1, the subsequent NaOH addition until the pH was basic resulted in slight re-dissolving of uranium species, confirming that an acidic pH for uranium removal is advantageous before filtration, and only after a filtration addition of NaOH should be carried out advantageously.

The invention claimed is:

1. A method of removing a uranium source from a water, comprising
   a) providing a water comprising a uranium source;
   b) optionally regulating the pH of the water comprising the uranium source to be in a range between and including 4.5 and <7.0;
   c) adding an iron (III) salt to the water comprising the uranium source;
   d) adding a powder to the water, wherein the powder comprises
      (i) an alkaline earth carbonate,
      (iii) at least one alkali metal hydrogen carbonate, and optionally (ii) an alkaline earth compound chosen from a chloride and/or a nitrate compound, and optionally (iv) an alkali metal carbonate,
   and forming a precipitate comprising the uranium source; and
   e) removing the precipitate comprising the uranium source.

2. The method of claim 1, wherein the iron (III) salt is iron (III) chloride and/or iron (III) sulfate.

3. The method of claim 2, wherein the iron (III) salt is iron (III) chloride.

4. The method of claim 1, wherein the molar ratio of components (i) and (ii) in step d) is in a range of from 1:2 to 1:6; and/or wherein component (iv), if present, is present in an amount of up to 200 mol % in relation to the molar amount of component (iii).

5. The method of claim 1, wherein step e) comprises a filtration.

6. The method of claim 5, wherein step e) comprises a filtration through a membrane filter and/or a sand filter.

7. The method of claim 1, wherein a flocculation aid is added prior to step e).

8. The method of claim 1, wherein the powder in step d) is added in an amount of 20 to 500 mg/L water.

9. The method of claim 8, wherein the powder in step d) is added in an amount of 35 to 350 mg/L water.

10. The method of claim 1, wherein the iron (III) salt is added in an amount of 1 to 100 mg/L water.

11. The method of claim 10, wherein the iron (III) salt is added in an amount of 2 to 50 mg/L water.

12. The method of claim 10, wherein the iron (III) salt is added in an amount of 3 to 20 mg/L water.

13. The method of claim 10, wherein the iron (III) salt is added in an amount of 8 to 19 mg/L water.

14. The method of claim 10, wherein the iron (III) salt is added in an amount of 14 to 18 mg/L water.

15. The method of claim 1, wherein step b) of regulating the pH of the water comprising a uranium source comprises:
   b-i) measuring the pH of the water comprising the uranium source, and
   b-ii) adding an acid to the water comprising the uranium source.

16. The method of claim 15, wherein step b) of regulating the pH of the water comprising a uranium source comprises:

b-i) measuring the pH of the water comprising the uranium source, and
   b-ii) adding an acid to the water comprising the uranium source, wherein the acid is an inorganic acid.

17. The method of claim 15, wherein step b) of regulating the pH of the water comprising a uranium source comprises:
   b-i) measuring the pH of the water comprising the uranium source, and
   b-ii) adding an acid to the water comprising the uranium source, wherein the acid is aqueous hydrochloric acid and/or aqueous sulfuric acid.

18. The method of claim 1, wherein after step d) the water is allowed to react for a time of between 10 minutes and 6 hours.

19. The method of claim 1, which comprises
   d) adding a powder to the water, wherein the powder comprises
      (i) an alkaline earth carbonate,
      (iii) at least one alkali metal hydrogen carbonate,
      (ii) an alkaline earth compound chosen from a chloride and/or a nitrate compound, and
      (iv) an alkali metal carbonate.

20. A kit for removing a uranium source from a water, comprising, in separate containers:
   an iron (III) salt; and
   a powder comprising (i) an alkaline earth carbonate, (iii) at least one alkali metal hydrogen carbonate, optionally (ii) an alkaline earth compound chosen from a chloride and/or a nitrate compound, and optionally (iv) an alkali metal carbonate.

\* \* \* \* \*